United States Patent [19]

Miller

[11] Patent Number: 5,676,292
[45] Date of Patent: *Oct. 14, 1997

[54] REMOTE CARRIER DECK

[76] Inventor: Dick D. Miller, 2764 Lagrange Rd., Shelbyville, Ky. 40065

[*] Notice: The terminal 65 months of this patent has been disclaimed.

[21] Appl. No.: 662,501

[22] Filed: Jun. 13, 1996

Related U.S. Application Data

[63] Continuation-in-part of Ser. No. 359,365, May 31, 1989, abandoned.

[51] Int. Cl.$^6$ ............................................. B60R 9/06
[52] U.S. Cl. ..................... 224/524; 224/282; 224/506; 224/502
[58] Field of Search ......................... 224/502, 504, 224/505, 506, 507, 509, 522–527, 282, 42.21, 42.28, 518, 519, 520, 521, 553

[56] References Cited

U.S. PATENT DOCUMENTS

| | | | |
|---|---|---|---|
| 1,641,502 | 9/1927 | Price | 224/505 |
| 1,718,205 | 6/1929 | McNear | 224/506 |
| 1,778,788 | 10/1930 | Benedict | 224/506 |
| 1,848,401 | 3/1932 | Whiteside | 224/502 |
| 3,796,333 | 3/1974 | Goldstein | 224/509 |
| 4,099,760 | 7/1978 | Mascotte et al. | 224/553 |
| 4,394,947 | 7/1983 | Tartaglia | 224/519 |
| 4,400,129 | 8/1983 | Eisenberg et al. | 224/505 |
| 5,004,133 | 4/1991 | Wyers | 224/519 |

FOREIGN PATENT DOCUMENTS 633774A 12/1949 United Kingdom ............. 224/524

*Primary Examiner*—Henry J. Recla
*Assistant Examiner*—Gregory M. Vidovich
*Attorney, Agent, or Firm*—Middleton & Reutlinger; John F. Salazar

[57] ABSTRACT

An automotive remote carrier deck for transporting equipment or other material and attachable to a standard trailer hitch tongue. The remote carrier deck has a trailer hitch assembly which attaches directly to a trailer hitch tongue and which elevates the entire remote carrier deck to a height which is substantially above the trailer hitch tongue. The remote carrier deck hinges about a first securing pin allowing the entire deck to be raise in a vertical stored position or a usable horizontal position. A second securing pin allows the deck to be locked in the vertical and horizontal position. There is also an adjustable stop which determines the extent of downward rotation and horizontal level of the deck. The stop allows the horizontal angle of the deck to be adjusted when heavy items are placed thereon.

10 Claims, 5 Drawing Sheets

REMOTE CARRIER DECK

This application is a continuation in part application of U.S. patent application Ser. No. 07/359,365, filed May 31, 1989, now abandoned.

BACKGROUND OF THE INVENTION

1. Field of the Invention

The present invention relates to a remote carrier deck which attach to a trailer hitch tongue of an automobile for supporting and transporting heavy objects and other material.

2. Discussion of the Prior Art

There has always been a need to attach a carrier deck to the rear end of an automobile in order to transport heavy objects or machinery. Many prior art devices have attempted to provide such support by attaching directly to the automobile bumper or rear portion of the automobile itself. U.S. Pat. No. 3,176,903 discloses such a carrier device which transports motorcycles and other two wheel vehicles. For support and transportation of other items, flat rectangular support carrier decks have also been developed. U.K. Patent No. 633,774 discloses such a luggage carrier which obtains support by attaching to the bumper and the upper portion of the rear of the automobile. Carrier decks for heavier objects have also been developed. U.S. Pat. No. 3,913,811 discloses a utility carrier for transporting heavy equipment and attaches directly to a trailer hitch. However, these devices require obtrusive support structures, are located fairly low to the ground, are not easily foldable to an unused position and do not provide a means to move such heavy equipment onto the carrier deck itself. Additionally, prior art devices cannot support high weight machinery or other material which a user may want to transport. These problems found in prior art devices are overcome with the present invention.

SUMMARY OF THE INVENTION

The present invention is for a remote carrier deck attachable to the trailer hitch tongue of an automobile. The deck is rectangular and utilizes a trailer hitch assembly attached to said trailer hitch tongue and which enables the deck to be raised and lowered from a vertical storage position to a usable horizontal position. The assembly attaches directly to a trailer hitch tongue and elevates the deck to ensure proper clearance when heavy equipment or material may be placed upon the deck.

More particularly, the present invention comprises a remote carrier deck which has a trailer hitch assembly comprised of a vertically extending bracket and horizontal tongue support member which attach directly to a trailer hitch tongue. A rectangular remote carrier deck hingedly attaches to the vertically extending bracket by a first and second securing pin. The securing pins are inserted through outwardly extending first and second bracket arms of the carrier deck and then through the vertically extending bracket of the trailer hitch assembly. Removal of the lower securing pin allows the deck to be hinged about the first securing pin for raising and lowering the carrier deck. The second securing pin can also be inserted when the deck is in the vertical position to act as an outer stop engaging the exterior of the vertically extending bracket thereby keeping the carrier deck in the vertical position. The carrier deck has a downwardly extending stop which can also be adjusted when heavy equipment and the like are transported thereon in order to keep the deck in the horizontal position.

Finally, the present invention comprises an a remote automotive carrier dec comprising: a horizontal tongue support engaging a trailer hitch tongue; a vertically extending bracket fixedly attached to said horizontal tongue support and said trailer hitch tongue; a first securing pin for hingedly attaching said carrier deck to said vertically extending bracket; and, a second securing pin for locking said deck in the vertical position.

BRIEF DESCRIPTION OF THE DRAWINGS

A better understanding of the invention will be had upon reference to the following description in conjunction with the accompanying drawings in which like numerals refer to like parts and wherein.

DETAILED DESCRIPTION OF THE PREFERRED EMBODIMENT

Figure 1:
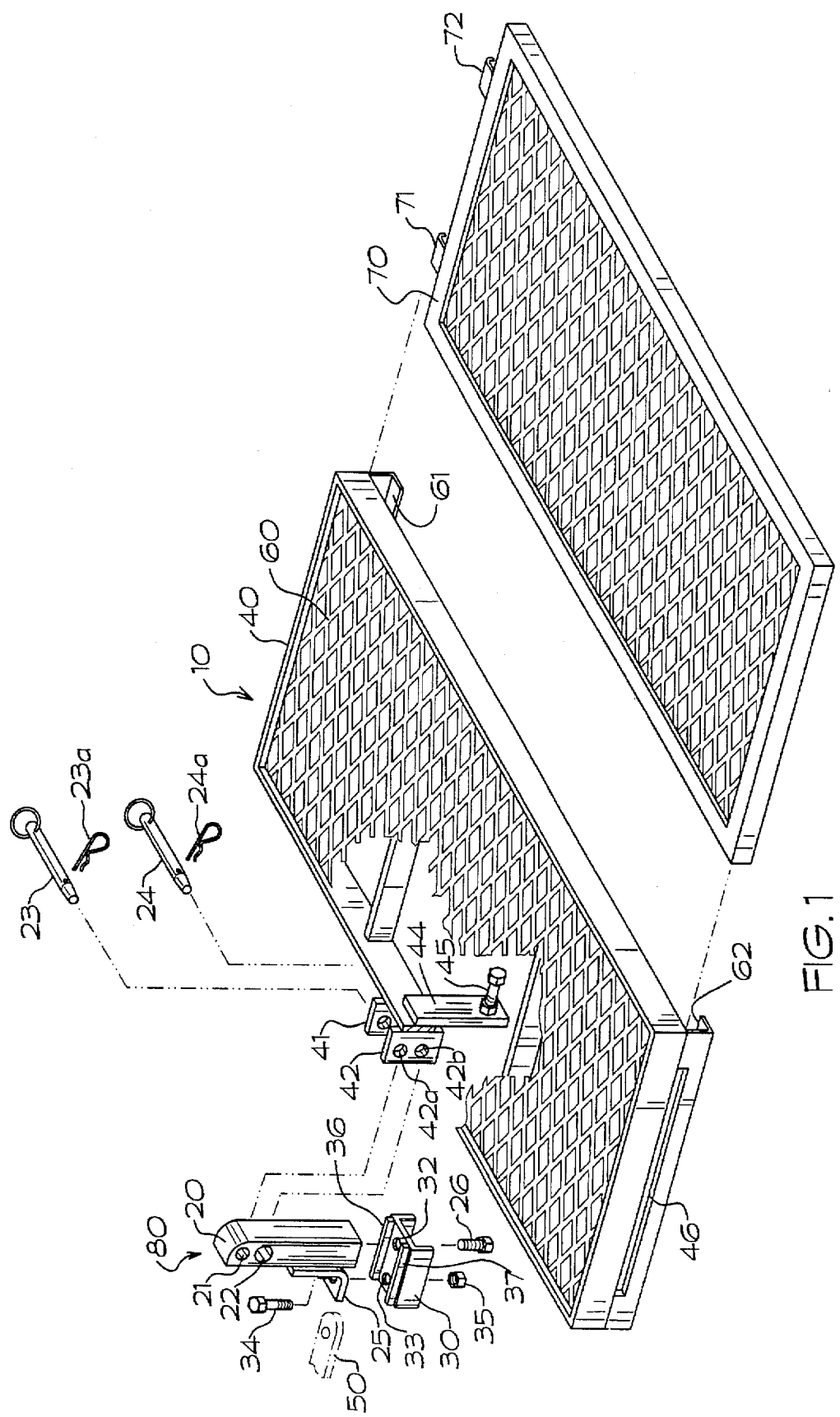
FIG. 1 is a perspective view of the carrier deck of the present invention.

The remote carrier deck 10 of the present invention is shown in FIG. 1. Deck 10 is attachable to a standard trailer hitch tongue 50, which extends outwardly from the automobile, by trailer hitch assembly 80. Attached to the trailer hitch tongue 50 and forming a portion of the hitch assembly 80 is horizontal tongue support 30 which has a wide lower channel and a narrower upper channel for fitting around differing width trailer hitch tongues. Extending through horizontal tongue support 30 is first and second apertures 32 and 33 for securing said tongue support 30 to the trailer hitch tongue 50.

Fixedly attached within the first or second channel of the horizontal tongue support 30 is vertically extending bracket 20. Vertically extending bracket 20 has upper and lower apertures 21 and 22 for receiving securing pins 23 and 24. L-shaped support bracket 25 is affixed to bracket 20 for secure connection to horizontal tongue support 30. Vertically extending bracket 20 is preferably made of steel and is approximately two inches by two inches. Bracket 20 fits securely within the upper channel formed in horizontal tongue support 30 by side walls 36 and 37 thereby allowing little or no side to side movement of bracket 20 within walls 36 and 37. Lower channel of the horizontal tongue support 30 fits over the outwardly extending trailer hitch tongue 50. Vertically extending bracket 20 is placed within the upper channel side walls 36 and 37 of the horizontal tongue support 30. Bolt 34 is inserted through an aperture formed in L-shaped bracket 25, through aperture 33 in horizontal tongue support 30 and through the trailer hitch tongue 50. Associated nut 35 secures the entire assembly together. An additional bolt 26 may be provided and inserted through aperture 32 of horizontal tongue support 30 and threadably received within the lower portion of vertically extending bracket 20 in order to further secure the hitch assembly 80. As indicated, vertically extending bracket 20 fits snugly within side walls 36 and 37 to prevent the hitch assembly, once loaded down by deck 10, from rotating.

Once the hitch assembly 80 is secured to the trailer hitch tongue 50, deck 10 can be attached to vertically extending bracket 20. Upper and lower apertures 21 and 22 receive first and second securing pins 23 and 24 in order to attach deck 10 to hitch assembly 80. First securing pin 23 is inserted through first and second bracket arms 41 and 42 through upper apertures 41a and 42a, said pin also passing through aperture 21 of vertically extending bracket 20 of the hitch assembly 80. Once inserted through the bracket arms 41 and 42 and bracket 20, deck 10 rotates about said first securing pin. Clip 23a ensures securing pin 23 cannot come loose from the hitch assembly or be removed therefrom.

Figure 2:
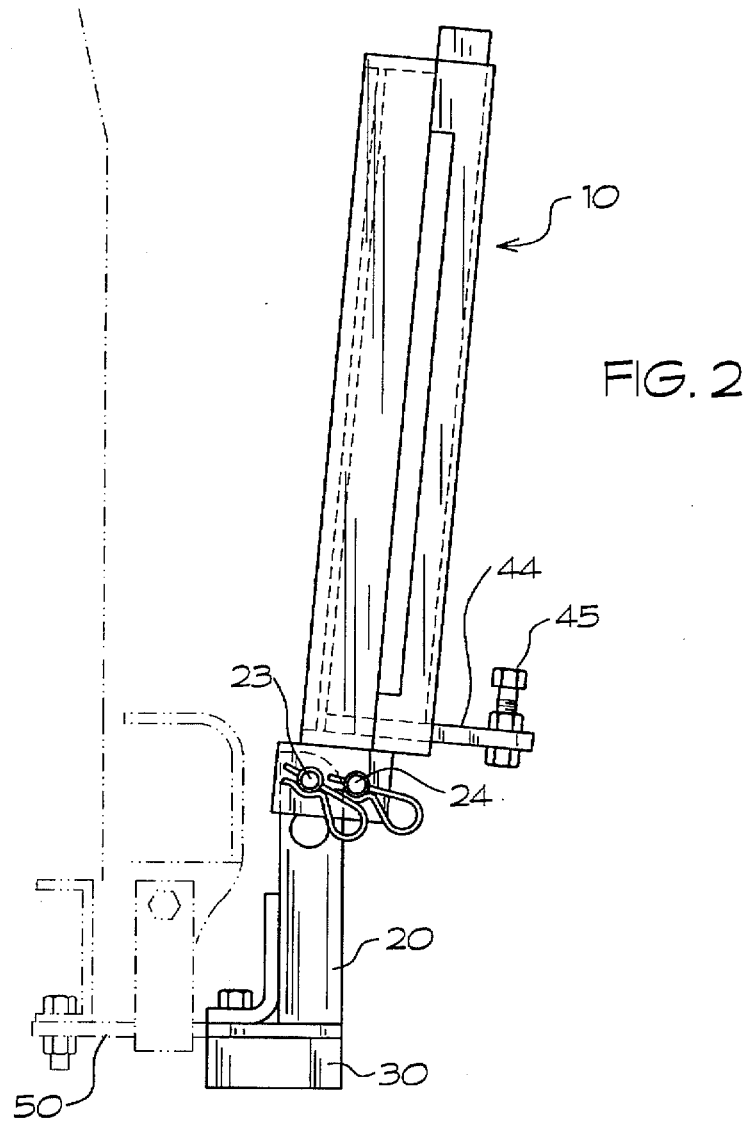
FIG. 2 is a side view of the carrier deck of the present invention in the vertical stored position.

As shown in FIG. 2, deck 10 is rotated in the vertical stored position and pivots about first securing pin 23. Second securing pin 24 is provided for two different functions. While the deck 10 is in the vertical stored position, second securing pin 24 can be inserted through lower apertures 41b and 42b causing the side of the securing pin 24 against bracket 20 and preventing the deck 10 from rotating to the downward position. Once the deck 10 is in the horizontal position, as shown in FIG. 3, second securing pin 24 is inserted through lower apertures 41b and 42b of first and second bracket arms 41 and 42 and also through lower aperture 22 of vertically extending bracket 20 thus preventing the deck 10 from further rotational movement.

Figure 3:
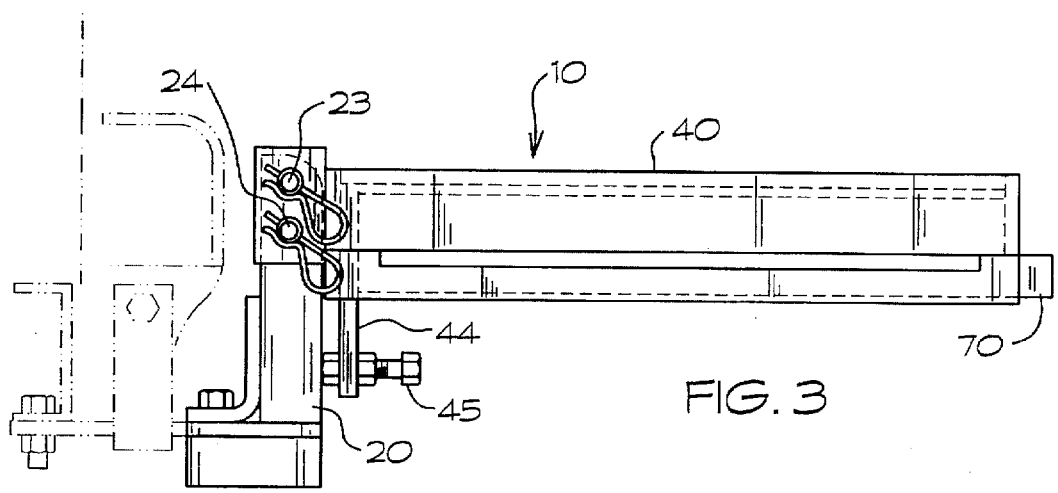
FIG. 3 is a side view of the carrier deck of the present invention.
Figure 4:
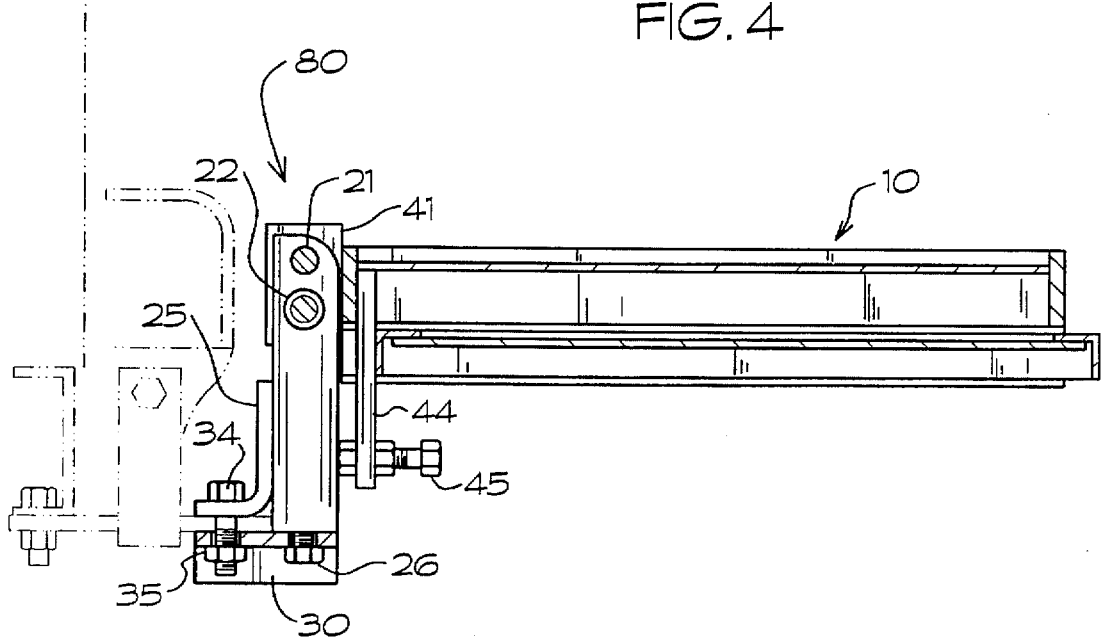
FIG. 4 is a partial sectional view of the carrier deck of the present invention.

When the deck is placed in the horizontal position, as shown in FIG. 3, downwardly extending stop member 44 is provided to prevent further downward rotation and ensure the deck 10 is level. Bolt 45 extends through stop 44 and engages the exterior surface of vertically extending bracket 20, as shown in FIG. 3. Downwardly extending stop 44 is adjustable using bolt 45 in order to adjust the horizontal angle of rectangular deck 10. Deck 10, shown in FIG. 3 in the horizontal position, requires adjustment when heavy equipment or material is placed upon the upper surface 60 of the deck 10. If a lawnmower or the like is placed upon the carrier deck 10, the weight is such that deck 10 may not be level due to the compression of the springs or shock absorbers of the automobile. To adjust deck 10 upwards when such weight is placed thereon, bolt 45 of downwardly extending stop 44 can be turned changing the angle of deck 10 as compared to vertically extending bracket 20.

To further adjustment of stop 44 and bolt 45 when heavy equipment causes the deck 10 to angle backwards due to high cargo weight, lower aperture 22 of the vertically extending bracket 20 has a larger diameter then upper aperture 21. This allows the deck to be adjusted to a horizontal position, as shown in FIG. 3, by turning adjustment bolt 45. If lower aperture 22 where merely the diameter of securing pin 24, as is the case with upper aperture 21 and pin 23, adjustment of bolt 45 would prevent second securing pin 24 from being inserted through bracket 20.

Horizontal tongue support 30 has upper and lower channels within which to receive a trailer hitch tongue. As shown in FIG. 1, the upper channel is narrower than the lower channel so that differing size trailer hitch tongues 50 can be attached to the trailer hitch assembly 80. The upper narrow channel bounded by upwardly extending channel walls 36 and 37 is the diameter of vertically extending bracket 20 so that the bracket 20 fits snugly between walls 36 and 37. However, if a narrow trailer hitch tongue is evident, horizontal tongue support 30 must be inverted so that side walls 36 and 37 extend around the narrow trailer hitch tongue. In order to secure vertical bracket 20 within the wider channel, metal shims (not shown) may be welded on either side of vertical bracket 20 to prevent any back and forth movement of bracket 20 within tongue support 30.

Figure 5:
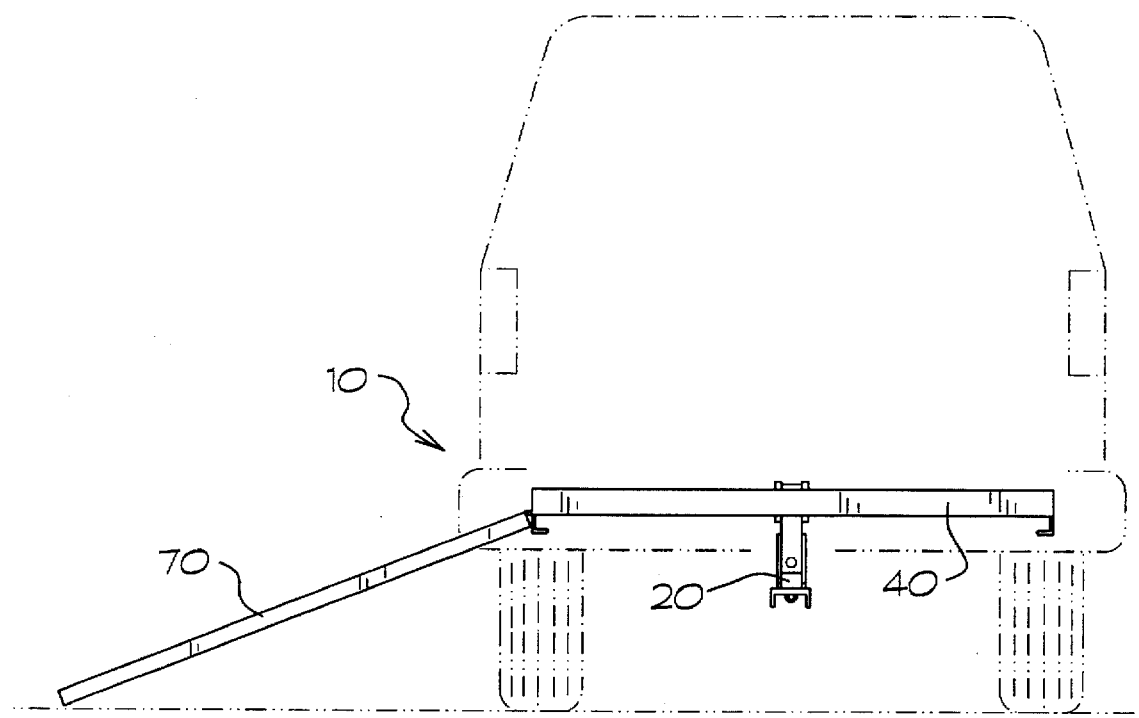
FIG. 5 is a rear view of the carrier deck of the present invention with the ramp removed and attached to the deck.

Returning to FIG. 1, below deck 10 are channel guides 61 and 62 for receiving deck ramp 70. Ramp 70 provides a means for loading and unloading heaving equipment, such as a lawnmower, onto deck 10. Ramp 70 slides below deck surface 60 within guides 61 and 62 and has downwardly extending lips or engagement tabs 71 and 72 for securing ramp 70 into slot 46 of carrier deck 10 providing a loading ramp for deck 10. If required to load or unload equipment or material onto or from carrier deck 10, ramp 70 is removed from the storage position between channels 61 and 62 and tabs 71 and 72 are secured into slot 46 or on rectangular rim 40 which circumscribes the carrier deck upper surface 60. FIG. 5 shows the carrier deck 10 and ramp 70 attached thereto along slot 46 so that a user can easily load and unload equipment or material from the deck 10. As stated previously, tabs 71 and 72 can also be placed above the deck rim 40 thereby removing any height differential between the uppermost portion of ramp 70 and carrier deck surface 60, as is evident in FIG. 5. Therefore, when rolling equipment upwards along the ramp 70, no extra force would be required to get the equipment over deck rim 40.

Ramp 70 may also be utilized as a deck extension when additional surface area of the remote carrier deck is required. Ramp 70 may be pulled from the channel guides 61 and 62 increasing the size of the remote carrier deck. The ramp may be extended and additional items and such may be placed thereon.

As can be seen on FIG. 1, the upper surface area 60 of deck 10 is made of cross hatched gridwork, the entirety of which is of metal construction. Preferably, a strong steel is utilized for both ramp 70 and the entirety of the remote carrier deck 10. In addition, trailer hitch assembly 80 is also made of a strengthened steel allowing the entire remote carrier deck to hold up to 500 pounds of weight or more, dependent upon the maximum tongue weight for the trailer hitch. As has been previously noted, when carrying high weight on the carrier deck, stop member 44 and bolt 45 can be adjusted to keep the carrier deck at a horizontal level.

Figure 6:
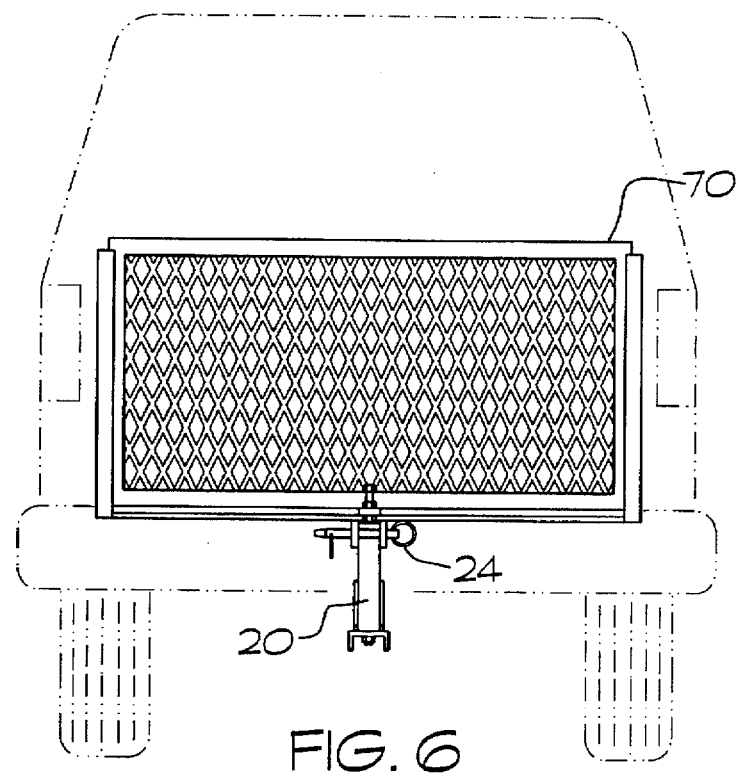
FIG. 6 is a rear view of the carrier deck of the present invention with the deck in the vertical stored position; and, FIG. 7 is a rear view of the carrier deck of the present invention with the deck in the vertical stored position having the ramp removed.
Figure 7:
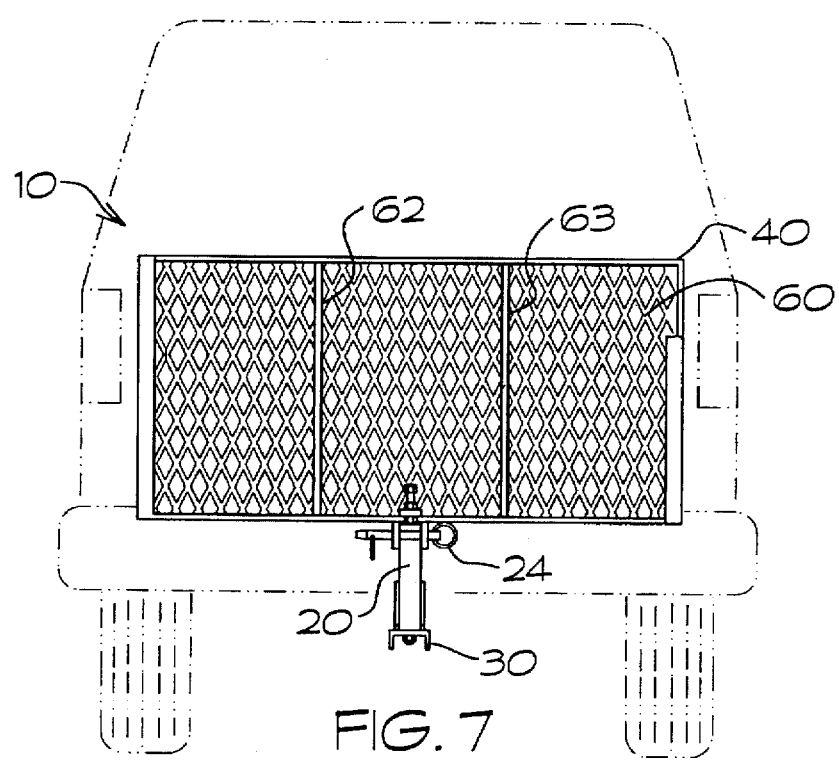

FIG. 6 and FIG. 7 show the carrier deck in the stored vertical position and securing pin 24 abutting vertical bracket 20 to keep the carrier deck in the upward stored position. In FIG. 6, ramp member 70 is visible and inserted within channel guides 61 and 62. In FIG. 7, the ramp member is removed and the cross hatched gridwork 60 is directly visible along with support members 62 and 63. FIGS. 6 and 7 also make evident the added benefit of vertical bracket 20 and the height increase which it provides as the deck 10 is kept above the rear bumper of the automobile.

Vertically extending bracket 20 effectively raises the clearance level of remote carrier deck 10 when loaded with heavy equipment or material. By providing upper and lower apertures 21 and 22 at the uppermost end of vertically extending bracket 20, the total clearance level of the carrier deck 10, even the rearward most portion, remains high enough to prevent dragging or scraping the ground when heavily loaded. Many prior art devices extended directly behind the trailer hitch or other support structure thereby causing the rearward most portion of the device to scrape the ground when heavily loaded. The present invention provides adequate clearance preventing such occurrence.

The foregoing detailed description is given primarily for clearness of understanding and no unnecessary limitations are to be understood therefrom for modifications will become obvious to those skilled in the art upon reading this disclosure and may be made without departing from the spirit of the invention or the scope of the appended claims.

What is claimed is:

1. An automotive carrier deck for fitting over an existing trailer hitch tongue, comprising:

a horizontal tongue support having an aperture therethrough, said horizontal tongue support adapted to be secured to said trailer hitch tongue;

a vertically extending bracket having an upper and lower end, said upper end having an aperture extending laterally therethrough, said lower end having an L-shaped member for receiving a bolt, said bolt extending upward and having an associated nut, said bolt extending through said L-shaped member, said aperture of said horizontal tongue support and said trailer hitch support for securely attaching said vertically extending bracket to said horizontal tongue support and said trailer hitch tongue;

a first securing pin; and, a rectangular deck having a first and a second outwardly extending bracket arm, each of said arms having an upper and lower aperture formed therethrough, said deck hingedly attached to said vertically extending bracket by said first securing pin inserted through said aperture of said vertically extending bracket and said upper aperture of said first and second outwardly extending arm.

2. The automotive carrier deck of claim 1 wherein said rectangular deck further comprises an downwardly extending stop with an aperture at its distal end, said aperture having therethrough a bolt.

3. The automotive carrier deck of claim 1 wherein said rectangular deck further comprises channels at opposite ends therebelow to receive and store a ramp member.

4. The automotive carrier deck of claim 3 wherein said ramp member has located thereon at one end at least one downwardly extending tab.

5. The automotive carrier deck of claim 1 whereby said rectangular deck has a second securing pin inserted through said lower apertures of said first and second outwardly extending bracket arms when said deck is in the vertical position, said second securing pin engaging said vertically extending bracket preventing said rectangular deck from rotating to the horizontal position.

6. The automotive carrier deck of claim 1 wherein said horizontal tongue support has a first channel with two side walls and a bottom surface and a second channel on the opposite side having two side walls and a bottom surface, said first channel being narrower in width than said second channel, whereby said horizontal tongue support may be utilized for both wide and narrow trailer hitch support members.

7. An automotive carrier device for attachment to a trailer hitch tongue, comprising:

(a) a rectangular deck having a circumscribing rail and a first and second bracket arm extending outward therefrom, said first and second bracket arm each having an upper and lower aperture formed therethrough;

(b) a horizontal tongue support having an aperture formed therethrough, said tongue support adapted to be aligned with said trailer hitch tongue;

(c) a vertically extending bracket having a first aperture formed therethrough on one end and a threaded aperture for receiving a bolt, said bolt adapted to extend through said trailer hitch tongue, said tongue support aperture and said threaded aperture for securing said vertically extending bracket and said horizontal tongue support to said trailer hitch tongue;

(d) a first securing pin extending through the upper apertures of said first and second bracket arm and said first aperture of said vertically extending bracket pivotally mounting said deck on said vertically extending bracket; and, (e) opposing channel members formed below and on opposite ends of said deck which slidably receive an extension ramp therein.

8. The automotive carrier device of claim 7 further comprising a second securing pin extending through the lower apertures of said first and second bracket arms outwardly extending from said deck, said deck pivoted in a vertical position about said first securing pin, said second securing pin having a lateral portion between said first and second bracket arms compressing against said vertically extending bracket thereby holding said deck in a vertical position.

9. The automotive carrier device of claim 7 further comprising a downwardly extending stop attached at one end to said rectangular deck and having at the opposite end a threaded bolt extending therethrough, said bolt compressing against said vertically extending bracket.

10. The automotive carrier device of claim 7 wherein said extension ramp further comprises a downwardly extending tab.

* * * * *